United States Patent [19]

Konno et al.

[11] Patent Number: 5,393,823
[45] Date of Patent: Feb. 28, 1995

[54] COATING RESIN COMPOSITION

[75] Inventors: Hidetoshi Konno, Izumi-ohtsu; Masataka Ooka, Nara; Hirofumi Takeda, Yao; Hiroshi Sakamoto, Ikaruga, all of Japan

[73] Assignee: Dainippon Ink and Chemicals, Inc., Tokyo, Japan

[21] Appl. No.: 137,224

[22] Filed: Oct. 18, 1993

Related U.S. Application Data

[63] Continuation of Ser. No. 812,850, Dec. 20, 1991, abandoned, which is a continuation of Ser. No. 489,864, Mar. 5, 1990, abandoned, which is a continuation of Ser. No. 10,542, Feb. 3, 1987, abandoned.

[30] Foreign Application Priority Data

Feb. 4, 1986 [JP] Japan .................................. 61-21224
Oct. 31, 1986 [JP] Japan ................................. 61-260456

[51] Int. Cl.$^6$ ................................................ C08F 8/42
[52] U.S. Cl. ...................................... 524/507; 524/512; 524/535; 525/123; 525/160; 525/326.5; 525/355; 525/366; 525/370; 525/403; 516/279; 528/403
[58] Field of Search ............... 525/123, 403, 160, 355, 525/366, 370; 526/279; 528/403; 524/507, 512, 535

[56] References Cited

U.S. PATENT DOCUMENTS

| | | | |
|---|---|---|---|
| 3,423,376 | 1/1969 | Gobran et al. | 526/279 |
| 3,453,136 | 7/1969 | Bylsma | 526/279 |
| 3,706,697 | 12/1972 | Backderf | 526/279 |
| 4,043,953 | 8/1977 | Chang et al. | 526/279 |
| 4,478,990 | 10/1984 | Kohno et al. | 526/279 |
| 4,544,724 | 10/1985 | Sogah et al. | 526/279 |
| 4,578,417 | 3/1986 | Furukawa et al. | 526/279 |
| 4,684,697 | 8/1987 | Chang et al. | 528/28 |

FOREIGN PATENT DOCUMENTS

| | | |
|---|---|---|
| 0024728 | 3/1981 | European Pat. Off. |
| 56-14550 | 2/1981 | Japan |
| 58-13663 | 1/1983 | Japan |

OTHER PUBLICATIONS

P. Bajaj and D. C. Cupta, "Copolymerization of Acrylonitrile with [(2-Methacryloyloxy)alkoxy]trimethylsilanes", J. Macromol. Sci.-Chem., A19(4), pp. 509–524 (1983).

Primary Examiner—Bernard Lipman
Attorney, Agent, or Firm—Sherman and Shalloway

[57] ABSTRACT

A coating resin composition comprising (I) a vinyl polymer obtained by polymerizing (A) 1 to 100% by weight of a vinyl monomer having at least one unsaturated double bond and at least one siloxy group per molecule and (B) 99 to 0% by weight of a copolymerizable vinyl monomer other than (A) in the presence of a radical generator and (II) a curing agent having reactivity with the hydroxyl groups generated from the polymer (I), and optionally (III) a siloxy group-dissociating catalyst.

26 Claims, No Drawings

COATING RESIN COMPOSITION

This application is a continuation of application Ser. No. 07/812,850, filed Dec. 20, 1991, which is a continuation of application Ser. No. 07/489,864, filed Mar. 5, 1990, which is a continuation of application Ser. No. 07/010,542, filed Feb. 3, 1987, all abandoned.

This invention relates to a novel and useful coating resin composition, and more specifically to a coating resin composition comprising (I) a vinyl polymer obtained by polymerizing a specific amount of a vinyl monomer having at least one polymerizable unsaturated double bond and at least one siloxy group per molecule and optionally another vinyl monomer copolymerizable with it and (II) a curing agent having reactivity with the hydroxyl groups produced from the polymer (I), and as required, (III) a siloxy group-dissociating catalyst.

In recent years, materials for exterior boards, component parts, etc. of automobiles have rapidly been superseded by plastic materials. When the materials are steel sheets, high-temperature baking one-can paints containing an aminoplast-type curing agent are usually employed. However, high-temperature baking paints cannot be applied to plastic materials because of their low heat resistant temperatures. Thus, a combination system of a polyol-type resin and an isocyanate prepolymer, an aminoplast resin system using a curing catalyst, and a combination system of an acrylic resin having a tertiary amino group as a functional group and a polyfunctional epoxy resin, etc. have been studied and partly come into commercial acceptance. Paints of the polyol-type resin/isocyanate prepolymer system and paints of the tertiary amino group-epoxy resin curing system are both of the two-can type, and have great defects in regard to handling properties such as pot life in comparison with one-can type. Paints of the aminoplast resin-curing system using low-temperature curing catalysts are of the one-can type, but have the defect of poor storage stability because the functional groups are not blocked and they have high activity. If isocyanate prepolymers blocked with a suitable blocking agent are used, there can be obtained a one-can polyol-type resin/isocyanate prepolymer curing system. This system, however, cannot be cured at low-temperatures since the blocking agent has a high dissociation temperature. It is desired therefore in the industry to develop a one-can curable acrylic resin paint having excellent storage stability in order to ensure handling properties in coating, various physical properties and weatherability, cope with changing of materials for coating substrates and to save energy.

The present inventors have made extensive investigations in order to obtain an acrylic paint which meets the various requirements described above. These investigations have now led to the discovery that a polymer from a vinyl monomer having at least one unsaturated double bond and at least one siloxy group per molecule can surprisingly improve these required properties.

Thus, according to this invention there is provided a coating resin composition comprising (I) a vinyl polymer obtained by polymerizing (A) 1 to 100% by weight of a vinyl monomer having at least one unsaturated double bond and at least one siloxy group per molecule and (B) 99 to 0% by weight of a vinyl monomer other than the monomer (A) in the presence of a radical generator and (II) a curing agent having reactivity with the hydroxyl groups generated from the polymer (I), and optionally (III) a siloxy group dissociating catalyst.

The siloxy groups in the vinyl monomer (A) react with moisture in the air to form hydroxyl groups, and the hydroxyl groups react with the curing agent (II) to form a firm coated film. The composition of this invention has excellent storage stability and can be used as a one-can type paint.

The vinyl monomer (A) is a vinyl monomer containing at least one polymerizable unsaturated double bond and at least one siloxy group bonded to the carbon atom as shown by the following formula per molecule.

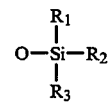

wherein $R_1$ and $R_2$ are identical or different and each represents a phenyl, allyl or $C_1$–$C_{18}$ alkyl group or a hydrogen, chlorine or fluorine atom, and $R_3$ represents a phenyl, allyl or $C_1$–$C_{18}$ alkyl group.

Vinyl monomers (A) are obtained by reacting trialkylchlorosilanes, triphenylchlorosilane, triallylchlorosilane, dialkylchlorosilanes, dialkyldichlorosilanes, dialkylhydrosilanes, etc. with hydroxyl-containing vinyl monomers to be described in the presence of hydrochloric acid scavengers such as triethylamine or pyridine. Typical examples of the monomer (A) are trimethylsiloxyethyl (meth)acrylate, trimethylsiloxypropyl (meth)acrylate, trimethylsiloxybutyl (meth)acrylate, triethylsiloxyethyl (meth)acrylate, tributylsiloxypropyl (meth)acrylate and triphenylsiloxyalkyl (meth)acrylates. They may be used singly or in combination.

Typical examples of the hydroxyl-containing vinyl monomers include hydroxyalkyl vinyl ethers such as hydroxyethyl vinyl ether or hydroxybutyl vinyl ether; hydroxyalkyl (meth)acrylates such as beta-hydroxyethyl (meth)acrylate, beta-hydroxypropyl (meth)acrylate or beta-hydroxybutyl (meth)acrylate; N-methylolated (meth)acrylamide; an adduct of beta-hydroxyethyl (meth)acrylate with epsilon-caprolactone; polyethylene glycol mono(meth)acrylate or polypropylene glycol mono(meth)acrylate; and adducts of unsaturated carboxylic acids such as (meth)acrylic acid, maleic acid, fumaric acid or itaconic acid with monoglycidyl esters of monocarboxylic acids such as glycidyl esters of branched fatty acids, glycidyl octylate or a glycidyl ester of coconut oil fatty acid or with monoepoxy compounds typified by a monoglycidyl ether such as butylglycidyl ether. The suitable amount of the vinyl monomer (A) is 1 to 100% by weight, preferably 5 to 90% by weight. If it is less than 1% by weight, the effect of the monomer (A) cannot be expected.

Typical examples of the vinyl monomer (B) include (meth)acrylic acid esters containing no functional group such as alkyl (meth)acrylates having a $C_1$–$C_{22}$ alkyl group in the side chain, 2-ethoxyethyl (meth)acrylate or cyclohexyl (meth)acrylate; aromatic vinyl monomers such as styrene, vinyltoluene, t-butylstyrene or alpha-methylstyrene; epoxy group-containing vinyl monomers such as glycidyl (meth)acrylate or beta-methylglycidyl (meth)acrylate; carboxyl group-containing vinyl monomers, for example half esters of dicarboxylic acids derived from unsaturated carboxylic acids such as (meth)acrylic acid, maleic acid, fumaric acid or itaconic acid or unsaturated dicarboxylic acids such as maleic acid, fumaric acid or itaconic acid and monohydric alcohols having 1 to 4 carbon atoms; diesters of the aforesaid dicarboxylic acids and monohydric alcohols having 1 to 18 carbon atoms; nitrogen-containing vinyl monomers, for example (meth)acrylamides such as (meth)acrylamide or N-alkoxymethylated (meth)acrylamide, or N,N-dialkylaminoalkyl (meth)acrylates; phosphoric acid group-containing vinyl monomers such as dialkyl[(meth))acryloyloxyalkyl] phosphates or (meth)acryloyloxy alkyl acid phosphates; vinyl esters such as vinyl acetate or vinyl propionate; and fluorine-containing vinyl monomers such as hexafluoropropylene, chlorotrifluoroethylene or tetrafluoroethylene.

These vinyl monomers (B) may be used singly or in combination according to the desired film properties. The aforesaid hydroxyl group-containing vinyl monomers may also be used as the vinyl monomer (B). However, when the functional groups of the vinyl copolymer (I) are not blocked at all and a polyisocyanate compound having free isocyanate groups, a chelate compound, an alcoholate of a polyvalent metal, etc. are used as the curing agent (II), the use of the hydroxyl group-containing vinyl monomers is undesirable since it reduces the storage stability of the resulting composition as a one-can paint. On the other hand, when an aminoplast resin is used as the curing agent (II), the hydroxyl group-containing vinyl monomers can be used. In view of the fact that a curing catalyst is added optionally to impart low-temperature curability, the amount of the hydroxyl group-containing vinyl monomer used should be less than 5% by weight which amount does not adversely affect the storage stability of the composition as a one-can paint.

The vinyl polymer (I) may be obtained by conventional known methods using the monomers exemplified above. For example, the polymerization may be carried out by the solution polymerization technique using radical generators.

The radical generators may be any of those which can be used normally in the polymerization of acrylic monomers. Typical examples of the radical generators are azobisisobutyronitrile, di-tert-butyl peroxide and benzoyl peroxide. Examples of solvents that can be used in the polymerization include aromatic hydrocarbons such as toluene or xylene; acetic acid esters such as ethyl acetate, butyl acetate, or Cellosolve acetate; ketones such as methyl ethyl ketone or methyl isobutyl ketone; alcohols such as butanol or isobutanol; and Cellosolves such as methyl Cellosolve or ethyl Cellosolve. When a polyisocyanate compound having a free isocyanate group is used as the curing agent (II), alcohols should not be used as these solvents.

As required, there can be used ordinary chain transfer agents such as mercaptan, alpha-methylstyrene dimer or terpene hydrocarbon having the molecular formula $C_{10}H_{16}$.

The vinyl polymer (I) so obtained preferably has a number average molecular weight ($\overline{Mn}$) of 500 to 50,000. If the $\overline{MMn}$ of the polymer (I) is less than 500, the properties of a coated film prepared from the resulting composition are not sufficient. If, in an attempt to provide sufficient film properties, the hydroxyl number of the polymer (I) after liberation of trialkylsiloxy groups, etc. is increased, a coated film obtained from the resulting composition becomes undesirably brittle. On the other hand, if $\overline{Mn}$ exceeds 50,000, the handling properties of the resulting composition in coating and the outside appearance, gloss and richness of a coated film prepared from it tend to become defective.

When the vinyl polymer (I) has only the hydroxyl groups generated from the vinyl monomer (A) as functional groups, a polyisocyanate compound, an aminoplast, a chelate compound or a polyvalent metal alcoholate are used as the curing agent (II).

Typical examples of the polyisocyanate compound include aromatic diisocyanates such as tolylene diisocyanate, diphenylmethane diisocyanate or xylylene diisocyanate; aliphatic diisocyanates such as tetramethylene diisocyanate, hexamethylene diisocyanate or trimethylhexane diisocyanate; alicyclic diisocyanates such as isophorone diisocyanate, methylcyclohexane-2,4-(or 2,6-)-diisocyanate, 4,4'-methylenebis(cyclohexyl isocyanate) or 1,3-di(isocyanatemethyl)cyclohexane; adducts of the aforesaid diisocyanates with polyhydric alcohols (e.g., ethylene glycol, propylene glycol, neopentyl glycol or trimethylolpropane), polyester resins (including oil-modified polyester resin) having a very low molecular weight and containing a functional group reactive with the isocyanate groups or water; and isocyanates (including oligomers) having an isocyanurate group obtained by polymerizing the aforesaid diisocyanates with each other.

Copolymers of at least one vinyl monomer having both at least one polymerizable unsaturated bond and at least one isocyanate group per molecule, typified by isocyanatoethyl (meth)acrylate, isocyanatopropyl (meth)acrylate, isocyanatobutyl (meth)acrylate or isopropenyl isocyanate with at least one of vinyl monomers (B) (excepting the hydroxyl group-containing monomers) exemplified hereinabove may also be used as the polyisocyanate compound.

In view of the film properties to be obtained, the mixing ratio of the vinyl polymer (I) to the polyisocyanate compound is preferably such that the equivalent ratio of the hydroxyl groups generated from the polymer (I) to the isocyanate groups in the polyisocyanate compounds is from 1:0.2 to 1:3.

The polyisocyanate compound may be incorporated in the vinyl polymer (I) in advance to form a one-can paint, or may be stored separately from the vinyl polymer (I) and mixed with it just prior to coating (two-can paint).

When the vinyl polymer (I) is prepared by using the hydroxyl group-containing vinyl monomer as the vinyl monomer (B), an aminoplast is preferred as the curing agent (II) in view of the storage stability of the resulting composition, although the polyisocyanate compound, chelate compound or polyvalent alcoholate may be incorporated in the polymer (I) immediately prior to coating instead of using the aminoplast. The aminoplast is typically an aminoplast etherified with a monohydric alcohol, and is usually employed in this form. The presence of the alcohol in the coating resin composition of this invention is likely to lead to reaction of the alcohol with the siloxy group and to reduce the long-term stability of the composition. Hence, hexamethoxymethylmelamine not containing an alcohol is preferred.

The amount of the aminoplast used is preferably 10 to 40% by weight of the vinyl polymer (I). Where long-term storage stability is not required, an alcohol solution of an aminoplast etherified with a monohydric alcohol may be used as the curing agent (II).

The polyvalent metal alcoholate or chelate compound used as the curing agent (II) is typically an alcoholate or chelate compound of aluminum, titanium, zirconium, cobalt, zinc, copper, lead, magnesium, vanadium, iron or nickel. From the standpoint of curability, low toxicity and low coloring tendency, alcoholates or chelate compounds of aluminum, titanium and zirconium are especially preferred.

Specific examples of the polyvalent metal alcoholate are aluminum isopropylate, aluminum n-butylate, aluminum sec-butylate, aluminum isobutylate, aluminum t-butylate, tetra-n-propyl titanate, tetra-i-propyl titanate, tetra-n-butyl titanate, tetra-n-butyl titanate dimer, tetra-n-butyl titanate tetramer, tetra-sec-butyl titanate, tetramethyl zirconate, tetraethyl zirconate, tetra-i-propyl zirconate, tetra-n-butyl zirconate and tetra-i-butyl zirconate.

On the other hand, the polyvalent metal chelate compound may be prepared by reacting the aforesaid alcoholates with chelating agents. Specific examples of the chelating agents include alkanolamines such as monoethanolamine, diethanolamine, triethanolamine and dimethylaminoethanol; acetoacetic acid esters such as methyl acetoacetate and ethyl acetoacetate; beta-diketones such as acetylacetone and benzoylacetone; malonic acid esters such as dimethyl malonate and diethyl malonate; salicylic acid esters such as methyl salicylate and ethyl salicylate; glycols such as ethylene glycol, 1,3-propanediol, 1,3-butanediol and octylene glycol; hydroxycarboxylic acids or esters thereof such as lactic acid and tartaric acid; and diacetone alcohol and catechol.

Specific examples of chelate compounds obtained from the alcoholates and chelating agents include aluminum bis(ethylacetoacetate) monoisopropylate, aluminum tris(ethylacetoacetate), aluminum bis(ethylacetoacetate) monoacetoacetonate, di-i-propoxy-bis(acetylacetone) titanate, di-t-propoxy-bis(ethylacetate)titanate, di-n-butoxy-bis(acetylacetone) titanate, di-n-butoxy-bis(triethanolamine) titanate, tetraoctylene glycol titanate, n-butoxy-tris(acetylacetone) zirconate, n-butoxy-tris(ethylacetoacetate) zirconate, tetrakis(acetylacetone) zirconate, tetrakis(ethyl acetoacetate) zirconate, tris(acetylacetone) monoethyl acetoacetate zirconate and bis(acetylacetone)bis(ethylacetoacetate) zirconate.

The amount of the polyvalent metal alcoholate or chelate compound to be mixed with the vinyl polymer (I) is 0.01 to 20% by weight, preferably 0.01 to 10% by weight, more preferably 0.05 to 5% by weight, based on the weight of the vinyl polymer (I). If this amount is less than 0.01% by weight, the resulting composition has poor curability. If it is used in an amount exceeding 20% by weight, the resulting cured product becomes very brittle.

When the composition of this invention is exposed to atmosphere, the polymer (I) is hydrolyzed by reaction with moisture in the air to form hydroxyl groups capable of reacting with the curing agent. The hydrolysis reaction proceeds without a catalyst when the composition is baked at a high temperature or the vinyl monomer (B) is a carboxyl group-containing vinyl monomer or a phosphoric acid group-containing vinyl monomer. Generally, a catalyst can be used in order to promote hydrolysis at lower temperatures.

This catalyst is a siloxy group-dissociating catalyst (III) for hydrolyzing the siloxy groups in the vinyl polymer (I) to form hydroxyl groups in the polymer (I). Examples of the dissociating catalyst (III) include phosphoric acid; phosphoric acid esters such as trimethyl phosphate, triethyl phosphate, tributyl phosphate, trioctyl phosphate, tributoxyethyl phosphate, trichloroethyl phosphate, tris-dichloropropyl phosphate, triphenyl phosphate, tricresyl phosphate, trixylenyl phosphate, cresyldiphenyl phosphate, octyldiphenyl phosphate, xylenyldiphenyl phosphate, trilauryl phosphate, tricetyl phosphate, tristearyl phosphate, trioleyl phosphate, monomethyl phosphate, dimethyl phosphate, monobutyl phosphate, dibutyl phosphate, monoisopropyl phosphate, diisopropyl phosphate, monooctyl phosphate, dioctyl phosphate, monoisodecyl phosphate, diisodecyl phosphate, monotridecanol phosphate and ditridecanol phosphate; phosphorous acid esters such as triphenyl phosphite, trisdodecyl phosphite and dibutyl hydrogen phosphite; phosphoric acid esters containing an unsaturated bond such as methacryloylethyl phosphate; acid catalysts such as p-toluenesulfonic acid, an amine salt thereof, benzoic acid, trichloroacetic acid, trifluoroacetic acid, naphthalenedisulfonic acid and an amine salt thereof; basic catalysts, for example amines (e.g., ethylenediamine, N-beta-aminoethyl-gamma-aminopropyl-trimethoxysilane, butylamine, dibutylamine, t-butylamine, hexylamine and triethylamine) and alkali metal hydroxides (such as lithium hydroxide, sodium hydroxide and potassium hydroxide); metal salts of carboxylic acids such as alkyltitanic acid salts, dibutyltin dilaurate and lead 2-ethylhexanoate; organic tin compounds of the sulfide or mercaptide type such as monobutyltin sulfide and dioctyltin mercaptide; and compounds capable of yielding a fluorine ion, such as tetraethyl ammonium fluoride and cesium fluoride. The amount of the dissociating catalyst to be incorporated is 0.001 to 10% by weight, preferably 0.005 to 8% by weight based on the weight of the polymer (I).

Since the composition of this invention does not form hydroxyl groups capable of reacting with the curing agent unless it is exposed to atmospheric air, it can be formed into a one-can paint having good storage stability. To ensure storage stability over an extended period of time, a tiny amount of moisture which comes into the composition for some reason or other should desirably be captured. Specifically, long-term stability can be ensured by adding a water-binding agent having reactivity with moisture. The water-binding agent may be incorporated in the early stage of producing the vinyl polymer (I).

Examples of the water-binding agent include trialkyl ortho-formates such as trimethyl ortho-formate, triethyl ortho-formate and tributyl ortho-formate; trialkyl ortho-acetates such as trimethyl ortho-acetate, triethyl ortho-acetate and tributyl ortho-acetate; trialkyl ortho-borates such as tributyl ortho-borate and triethyl ortho-borate; tetra(substituted)alkyl silicates such as tetramethyl silicate, tetraethyl silicate, tetrabutyl silicate, tetra(2-methoxyethyl) silicate and tetra(2-chloroethyl) silicate; equivalents of the above tetra(substituted)alkyl silicates such as tetraphenyl silicate and tetrabenzyl silicate; hydrolyzable ester compounds such as condensation products (e.g., dimers, trimers, tetramers, hexamers, etc.) of the above tetra(substituted)alkyl silicates or the equivalents thereof; compounds having an isocyanate group, such as phenyl isocyanate, p-chlorophenyl isocyanate, benzenesulfonyl isocyanate, p-toluenesulfonyl isocyanate and isocyanatoethyl methacrylate; acetals such as dimethoxyethane and 1,1-dimethoxypropane; and ketals such as 2,2-dimethoxypropane and 2,2-dimethoxybutane.

The amount of the water-binding agent used is 0.1 to 30% by weight, preferably 0.5 to 20% by weight, based on the weight of the vinyl polymer (I).

The composition of this invention so obtained may be used directly as a clear paint. Alternatively, by mixing a pigment with it, an enamel paint may be prepared. As required, various conventional additives such as a levelling agent, an ultraviolet absorber and a pigment dispersing agent, or conventional known cellulose compounds, plasticizers or polyester resins may be mixed with the composition of this invention.

The composition of this invention may be coated by conventional methods such as brush coating, spray coating or roll coating. The curing conditions may be designed optimally over a wide range from room temperature drying to heat drying depending upon the combination of the vinyl polymer, the curing agent and the siloxy group-dissociating catalyst which constitute the composition.

The composition of this invention, in the form of a solution or a powder, may be utilized in a wide range of applications including exterior coating of automobiles, household electrical appliances and buildings, precoating of metals, and coating of plastic materials. Its effect is especially outstanding in fields where a one-can paint having storage stability is required.

The following Referential Examples, Examples and Comparative Examples illustrate the present invention more specifically. All parts and percentages in these examples are by weight unless otherwise specified.

REFERENTIAL EXAMPLE 1

A monomeric mixture (1000 parts) was prepared from 300 parts of trimethylsiloxyethyl methacrylate, 200 parts of styrene, 400 parts of n-butyl methacrylate and 100 parts of lauryl methacrylate. A four-necked flask equipped with a stirring device, an inert gas introducing inlet, a thermometer and a condenser was charged with 200 parts of the monomeric mixture, 500 parts of toluene, 200 parts of isobutyl acetate, 5 parts of azobisisobutyronitrile (AIBN) and 10 parts of tert-butyl perbenzoate (t-BPB), and maintained at 90° C. for 1 hour. Then, the temperature was elevated to 115° C. over the course of 30 minutes, and a mixture composed of 800 parts of the monomeric mixture above, 300 parts of isobutyl acetate, 10 parts of t-BPB and 5 parts of AIBN was added dropwise over the course of 3 hours at the above temperature. The mixture was further maintained at the same temperature for 10 hours to give a resin solution having a non-volatile content of 49.8%, a viscosity (Gardner viscosity at 25° C.; the same in the subsequent examples) of Y-Z, a number average molecular weight of 13,000 and an OH value of 42.

REFERENTIAL EXAMPLE 2

A resin solution having a non-volatile content of 51.0%, a viscosity of Q-R, a number average molecular weight of 14,000 and an OH value of 8 was prepared by repeating the operation of Referential Example 1 except that a mixture composed of 150 parts of a reaction product of a hydroxyl group-containing vinyl monomer obtained by the addition reaction of 1 mole of beta-hydroxyethyl methacrylate with 3 moles of epsilon-caprolactone, with trimethylchlorosilane, 100 parts of styrene, 100 parts of n-butyl methacrylate, 100 parts of isobutyl methacrylate, 100 parts of n-butyl acrylate and 150 parts of lauryl methacrylate was used instead of the monomeric mixture used in Referential Example 1.

REFERENTIAL EXAMPLE 3

A resin solution having a non-volatile content of 49.1%, a viscosity of X, a number average molecular weight of 1,300 and an OH value of 22 was prepared by repeating the operation of Referential Example 1 except that a mixture composed of 250 parts of triphenylsiloxyethyl methacrylate, 20 parts of beta-hydroxyethyl methacrylate, 400 parts of styrene, 200 parts of n-butyl methacrylate and 130 parts of n-butyl acrylate was used instead of the monomeric mixture used in Referential Example 1.

REFERENTIAL EXAMPLE 4

A resin solution having a non-volatile content of 50.8%, a viscosity of Z, a number average molecular weight of 15,000 and an OH value of 19 was prepared by repeating the operation of Referential Example 1 except that a mixture composed of 135 parts of trimethylsiloxyethyl acrylate, 510 parts of methyl methacrylate, 350 parts of n-butyl methacrylate and 5 parts of methacrylic acid was used instead of the monomeric mixture used in Referential Example 1.

REFERENTIAL EXAMPLE 5

A four-necked flask equipped with a stirrer, an inert gas introducing inlet, a thermometer and a condenser was charged with 500 parts of toluene and 50 parts of isobutyl acetate and maintained at 110° C. Then, a monomeric mixture composed of 260 parts of trimethylsiloxyethyl methacrylate, 390 parts of n-butyl methacrylate, 150 parts of lauryl methacrylate and 200 parts of styrene and a mixture composed of 50 parts of AIBN and 450 parts of isobutyl acetate were added dropwise to the flask over the course of 5 hours. The mixture was maintained at the above temperature for 10 hours to give a resin solution having a non-volatile content of 50.9%, a viscosity of D, a number average molecular weight of 1,500 and an OH value of 36.

REFERENTIAL EXAMPLE 6

Preparation of a comparative resin solution:

A resin solution having a non-volatile content of 50.1%, a viscosity of V-W, a number average molecular weight of 13,000 and an OH value of 45 was prepared by repeating the operation of Referential Example 1 except that a mixture of 300 parts of beta-hydroxyethyl methacrylate, 200 parts of styrene, 400 parts of n-butyl methacrylate and 100 parts of lauryl methacrylate was used instead of the monomeric mixture used in Referential Example 1.

REFERENTIAL EXAMPLE 7

Preparation of a comparative resin solution:

A resin solution having a non-volatile content of 49.3%, a viscosity of X, a number average molecular weight of 14,000 and an OH value of 35 was prepared by repeating the operation of Referential Example 1 except that a mixture of 250 parts of triphenylsiloxyethyl methacrylate, 80 parts of beta-hydroxyethyl methacrylate, 400 parts of styrene, 140 parts of n-butyl methacrylate and 130 parts of n-butyl acrylate was used instead of the monomeric mixture used in Referential Example 1.

REFERENTIAL EXAMPLE 8

Preparation of a comparative resin solution:

A resin solution having a non-volatile content of 50.9%, a viscosity of V, a number average molecular weight of 14,000 and an OH value of 0.7 was prepared by repeating the operation of Referential Example 1 except that a mixture of 5 parts of trimethylsiloxyethyl methacrylate, 300 parts of styrene, 195 parts of isobutyl methacrylate, 400 parts of n-butyl methacrylate and 100 parts of lauryl methacrylate was used instead of the monomeric mixture used in Referential Example 1.

REFERENTIAL EXAMPLE 9

Preparation of a comparative resin solution:

A four-necked flask equipped with a stirrer, an inert gas introducing inlet, a thermometer and a condenser was charged with 500 parts of toluene and 50 parts of isobutyl acetate and maintained at 110° C. A monomeric mixture composed of 135 parts of trimethylsiloxyethyl methacrylate, 510 parts of methyl methacrylate, 350 parts of n-butyl methacrylate and 5 parts of methacrylic acid and a mixture composed of 10 parts of azobisisobutylonitrile, 40 parts of 2-mercaptoethanol and 450 parts of isobutyl acetate were added dropwise over the course of 5 hours. The mixture was maintained at the above temperature for 10 hours to give a resin solution having a non-volatile content of 49.0%, a viscosity of A, a number average molecular weight of 400 and an OH value of 24.

EXAMPLES 1-9 AND COMPARATIVE EXAMPLES 1-4

The vinyl polymer solutions obtained in the above Referential Examples were tested for various properties. Specifically, paints were prepared in accordance with the recipes shown in Table 1 by a conventional paint formulating method. The paints were subjected to testing of the various properties shown in Table 1. The results are summarized in Table 1.

The curing conditions for the coated films were as follows:

With an isocyanate prepolymer curing system, the coated films were baked at 80° C. for 20 minutes, and with an aminoplast curing system, they were baked at 100° C. for 20 minutes.

The tests were carried out after allowing the coated films to stand at room temperature for 3 days after baking.

"Burnock" DN-950" given in Table 1 is a trademark for a non-yellowing polyisocyanate prepolymer produced by Dainippon Ink and Chemicals, Inc.

The symbols used in evaluation in Table 1 have the following meanings.

⊚: Very good
○: Good
Δ: Fair
×: Poor

TABLE 1

| Vinyl polymer used | | E 1 | E 2 RE 1 | E 3 | CE 1 RE 6 | E 4 | E 5 RE 2 | E 6 RE 3 |
|---|---|---|---|---|---|---|---|---|
| Paint formation (parts) | Vinyl polymer solution | 100 | 100 | 100 | 100 | 100 | 100 | 100 |
| | "Burnock DN-950" | 25 | | 25 | 27 | 4.8 | | |
| | Hexamethoxymethylmelamine | | 36 | | | | 21 | 36 |
| | p-Toluenesulfonic acid | | 0.5 | | | 1 | 0.3 | 0.7 |
| | Dibutyltin diacetate | 0.1 | | | | | | |
| | Methacryloylethyl phosphate | | 0.1 | | | | | |
| | Trimethyl ortho-formate | 1 | | | | | | 1 |
| | Tetraethyl silicate | | | | | | | |
| Properties | Rutile-type titanium oxide | 46 | 48 | 46 | 47 | 36 | 42 | 48 |
| | Gloss (60°) | 93 | 90 | 95 | 88 | 91 | 89 | 93 |
| | Hardness (pencil hardness) | H | 2H | 2H | 2H | F | F | 3H |
| | Adhesion (cross hatch test) | 100/100 | 100/100 | 100/100 | 100/100 | 100/100 | 100/100 | 100/100 |
| | Xylene resistance (number of rubbings) | 60 | 78 | 75 | 55 | 40 | 53 | 70 |
| | Moisture resistance (50° C., 98% humidity, 240 hrs.) | ⊚ | ⊚ | ⊚ | ⊚ | ⊚ | ⊚ | ⊚ |
| | Bending resistance (6 mm φ) | ○ | ○ | ○ | ○ | ⊚ | ⊚ | ○ |
| | Storage stability (40° C., 1 month) | ⊚ | ⊚ | ⊚ | X | ⊚ | ⊚ | ⊚ |
| Remarks | | | | | Gelled in one day | | | |

| Vinyl polymer used | | CE 2 RE 7 | E 7 RE 4 | E 8 | E 9 RE 5 | CE 3 RE 3 | CE 4 RE 9 |
|---|---|---|---|---|---|---|---|
| Paint formaution (parts) | Vinyl polymer solution | 100 | 100 | 100 | 100 | 100 | 100 |
| | "Burriock DN-950" | | 11 | 22 | | 0.4 | 11 |
| | Hexamethoxymethylmelamine | 36 | | | 36 | | |
| | p-Toluenesulfonic acid | 0.5 | | | 0.5 | | |
| | Dibutyltin diacetate | | 0.1 | 0.5 | | 0.1 | 0.1 |
| | Methacryloylethyl phosphate | | | | | | |
| | Trimethyl ortho-formate | | | | | | |
| | Tetraethyl silicate | | 1 | 1 | | 2 | 1 |
| Properties | Rutile-type titanium oxide | 48 | 39 | 44 | 48 | 34 | 39 |
| | Gloss (60°) | 87 | 90 | 95 | 93 | 83 | 90 |
| | Hardness (pencil hardness) | 3H | 2H | H | H | 2B | 2B |
| | Adhesion (cross hatch test) | 100/100 | 100/100 | 100/100 | 100/100 | 50/100 | 30/100 |
| | Xylene resistance (number of rubbings) | 73 | 51 | 63 | 69 | 5 | 3 |
| | Moisture resistance (50° C., 98% humidity, 240 hrs.) | ⊚ | ⊚ | ⊚ | ⊚ | | |
| | Bending resistance (6 mm φ) | Δ | ○ | ○ | ○ | X | X |
| | Storage stability (40° C., 1 month) | X | ⊚ | ⊚ | ⊚ | ⊚ | ⊚ |
| Remarks | | Gelled | | | | | |

TABLE 1-continued in 5 days

E = Example; CE = Comparative Example; RE = Referential Example

The results given in Table 1 demonstrate that the coating resin compositions of this invention have excellent storage stability, excellent low-temperature curability and a well-balanced combination of various properties.

What is claimed is:

1. A one-can paint coating resin composition which is stable for a period of at least one month in the can comprising
    (I) a vinyl polymer obtained by polymerizing (A) 5 to 90% by weight of a vinyl monomer having at least one unsaturated double bond and at least one siloxy group per molecule whereby upon reaction with moisture in the air the siloxy group forms a hydroxyl group and (B) 95 to 10% by weight of a copolymerizable vinyl monomer other than (A) in the presence of a radical generator, and
    (II) a curing agent having reactivity with the hydroxyl groups generated upon reaction of the at least one siloxy group from the polymer (I) with moisture in the air,
    wherein said copolymerizable vinyl monomer is selected from the group consisting of (meth)acrylic acid esters containing no functional groups, aromatic vinyl monomers, hydroxyl group—containing vinyl monomers, (meth)acrylic acid and mixtures thereof.

2. A coating resin composition comprising:
    (I) a vinyl polymer obtained by polymerizing (A) 5 to 90% by weight of a vinyl monomer having at least on unsaturated double bond and at least one siloxy group per molecule whereby upon reaction with moisture in the air, the siloxy group forms a hydroxyl group and (B) 95 to 10% by weight of a copolymerizable vinyl monomer other than (A) in the presence of a radical generator,
    (II) a curing agent having reactivity with the hydroxyl groups generated upon reaction of the at least one siloxy group from the polymer (I) with moisture in the air, and
    (III) a siloxy group—dissociating catalyst,
    wherein said copolymerizable vinyl monomer is selected from the group consisting of (meth)acrylic acid esters containing no functional groups, aromatic vinyl monomers, hydroxyl group-containing vinyl monomers, (meth)acrylic acid and mixtures thereof.

3. The coating resin composition of claim 1 or 2 wherein the vinyl monomer (A) is a compound having both at least one unsaturated double bond and at least one siloxy group bonded to the carbon atom represented by the following formula

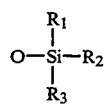

wherein $R_1$ and $R_2$ are identical or different and each represents a phenyl, allyl or $C_1$-$C_{18}$ alkyl group or a hydrogen, chlorine or fluorine atom, and $R_3$ represents a phenyl, allyl or $C_1$-$C_{18}$ alkyl group, per molecule.

4. The resin coating composition of claim 1 or 2 wherein the curing agent (II) is a polyisocyanate compound.

5. The coating resin composition of claim 1 or 2 wherein the curing agent (II) is an aminoplast.

6. The coating resin composition of claim 1 or 2 wherein the curing agent (II) is a polyvalent chelate compound.

7. The coating resin composition of claim 1 or 2 wherein the curing agent (II) is an alcoholate of a polyvalent metal.

8. The coating resin composition of claim 2 wherein the dissociating catalyst (III) is an acid catalyst.

9. The coating resin composition of claim 2 wherein the dissociating catalyst (III) is a basic catalyst.

10. The coating resin composition of claim 2 wherein the dissociating catalyst (III) is a metal salt of a carboxylic acid.

11. The coating resin composition of claim 2 wherein the dissociating catalyst (III) is an organic tin compound.

12. The coating resin composition of claim 2 wherein the dissociating catalyst (III) is a compound capable of yielding a fluorine ion.

13. The coating resin composition of claim 4 wherein the amount of the polyisocyanate compound is such that the equivalent ratio of the hydroxyl group generated from the siloxy groups of the vinyl polymer (I) to the isocyanate groups in the polyisocyanate compound is from 1:0.2 to 1:3.

14. The coating resin composition of claim 4 wherein the polyisocyanate compound is an aromatic diisocyanate, an aliphatic diisocyanate, an alicyclic diisocyanate or an adduct of said diisocyanate compound with a polyhydric alcohol, a polyester resin or water.

15. The coating resin composition of claim 4 wherein the polyisocyanate compound is an isocyanate having an isocyanurate group obtained by polymerizing an aromatic diisocyanate, an aliphatic diisocyanate or an alicyclic diisocyanate.

16. The coating resin composition of claim 4 wherein the polyisocyanate compound is a copolymer of at least one vinyl monomer having both at least one polymerizable unsaturated bond and at least one isocyanate group per molecule with another copolymerizable vinyl monomer not containing a hydroxyl group.

17. The coating resin composition of claim 1 or 2 wherein said copolymerizable vinyl monomer is selected from the group consisting of $C_1$-$C_{22}$ alkyl(meth-)acrylates; 2-ethoxyethyl (meth)acrylates; cyclohexyl (meth)acrylate; styrene; vinyl toluene; t-butylstyrene; alpha-methyl-styrene; hydroxyethyl vinyl ether; hydroxybutyl vinyl ether; beta-hydroxyethyl (meth)acrylate; beta-hydroxypropyl (meth)acrylate; beta-hydroxybutyl (meth)acrylate; N-methylolated (meth)acrylamide; adduct of beta-hydroxyethyl (meth)acrylate with epsilon-caprolactone; polyethylene glycol mono (meth-)acrylate; polypropylene glycol mono (meth)acrylate; adducts of (meth)acrylic acid, maleic acid, fumaric acid or itaconic acid with monoglycidyl esters of branched fatty acids, glycidyl octylate, glycidyl ester of coconut oil fatty acid or butylglycidyl ether; (meth)acrylic acid; and mixtures thereof.

18. A coating resin composition which is stable for at least one month and which is useful as a one-can paint comprising:
- (I) a vinyl polymer obtained by polymerizing (A) 5 to 90% by weight of a vinyl monomer having at least one unsaturated double bond and at least one siloxy group per molecule, whereby upon exposure to air the siloxy groups are hydrolyzed by moisture in the air to hydroxyl groups and (B) 95 to 10% by weight of a copolymerizable vinyl monomer selected from the group consisting of (meth)acrylic acid esters containing no functional groups, aromatic vinyl monomers, hydroxyl group-containing vinyl monomers, (meth)acrylic acid and mixtures thereof, in the presence of a radical generator,
- (II) a curing agent having reactivity with the hydroxyl groups generated from hydrolysis of the siloxy groups of the polymer (I) upon exposure of polymer (I) to moisture, and
- (III) 0.1 to 30% by weight based on the weight of the vinyl polymer (I) of a water binding agent having reactivity with moisture, whereby the composition will undergo curing by reaction of the curing agent with the hydroxyl groups formed by the hydrolysis of the siloxy groups of the polymer (I) only when the composition is exposed to moisture.

19. The composition of claim 18, wherein the amount of water binding agent (III) is 0.5 to 20% by weight based on the weight of the vinyl polymer (I).

20. The composition of claim 1, further comprising at least one additive selected from levelling agents, ultraviolet absorbers, pigment dispersing agents, cellulose compounds, plasticizers, polyester resins and mixtures thereof.

21. A two-can paint coating resin composition comprising:
- (I) a vinyl polymer obtained by polymerizing (A) 5 to 90% by weight of a vinyl monomer having at least one unsaturated double bond and at least one siloxy group per molecule whereby upon exposure to moisture in the air, the siloxy groups are hydrolyzed to hydroxyl groups, and (B) 95 to 10% by weight of a copolymerizable vinyl monomer selected from the group consisting of (meth)acrylic acid esters containing no functional groups, aromatic vinyl monomers, hydroxyl group-containing vinyl monomers, (meth)acrylic acid and mixtures thereof in the presence of a radical generator, and
- (II) a curing agent having reactivity with the hydroxyl groups generated from the siloxy groups of the polymer (I), which is stored separately form (I) until just prior to use, whereby the composition will undergo curing by reaction between the curing agent and hydroxyl groups formed by hydrolysis of the siloxy groups of the polymer (I) only when the composition is exposed to moisture.

22. The composition of claim 18, wherein the curing agent (II) is a polyisocyanate compound.

23. The composition of claim 22, wherein the polyisocyanate compound is used in an amount such that the equivalent ratio of the hydroxyl groups generated from the siloxy groups of polymer (I) to the isocyanate groups in the polyisocyanate is from 1:0.2 to 1:3.

24. The composition of claim 21, wherein the curing agent (II) is a polyisocyanate compound.

25. The composition of claim 1, wherein the amount of said curing agent present is 0.001–10% by weight based on the weight of the polymer (I).

26. The composition of claim 18, wherein the amount of said curing agent present is 0.001–10% by weight based on the weight of the polymer (I).

* * * * *